UNITED STATES PATENT OFFICE.

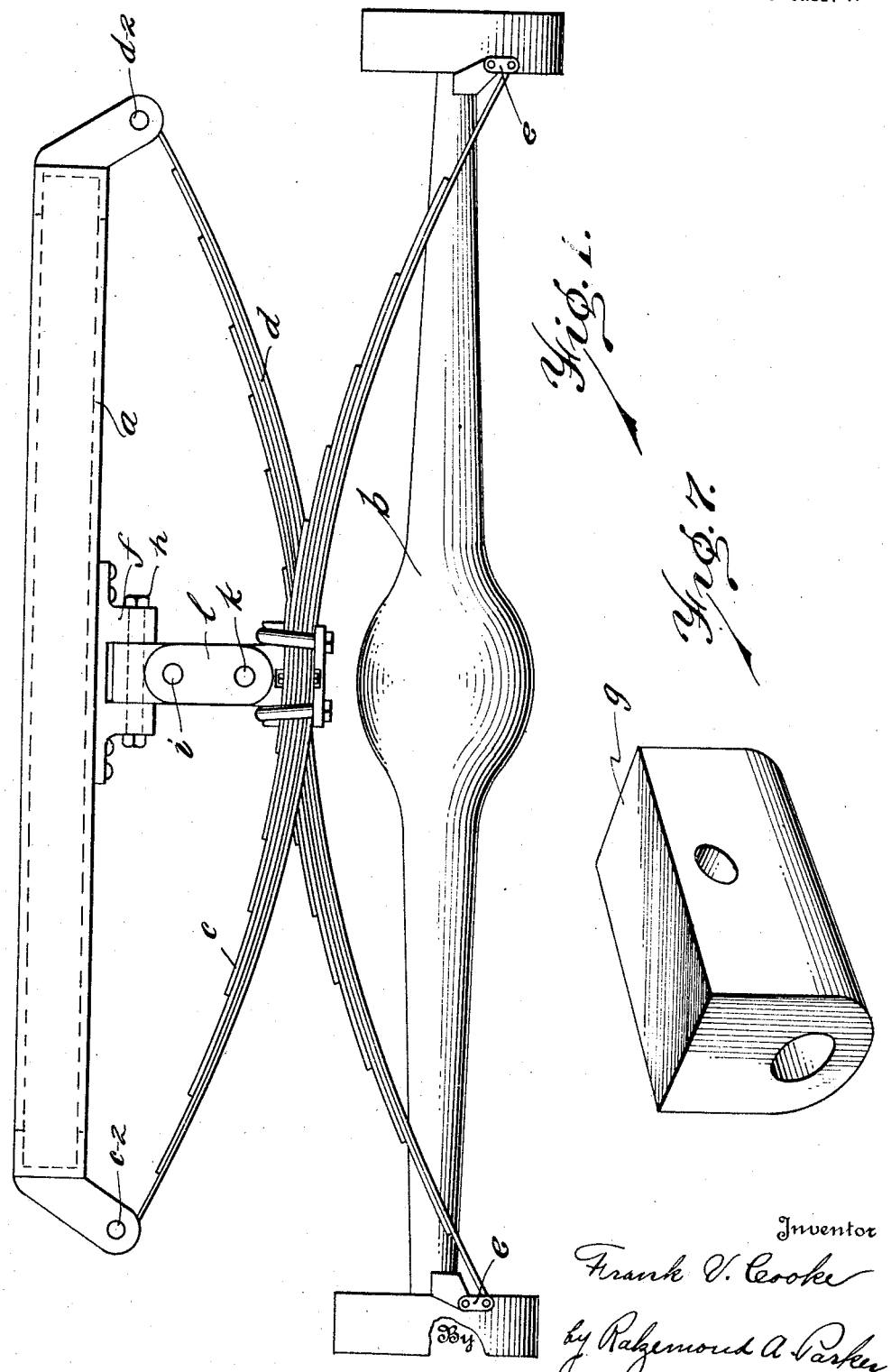

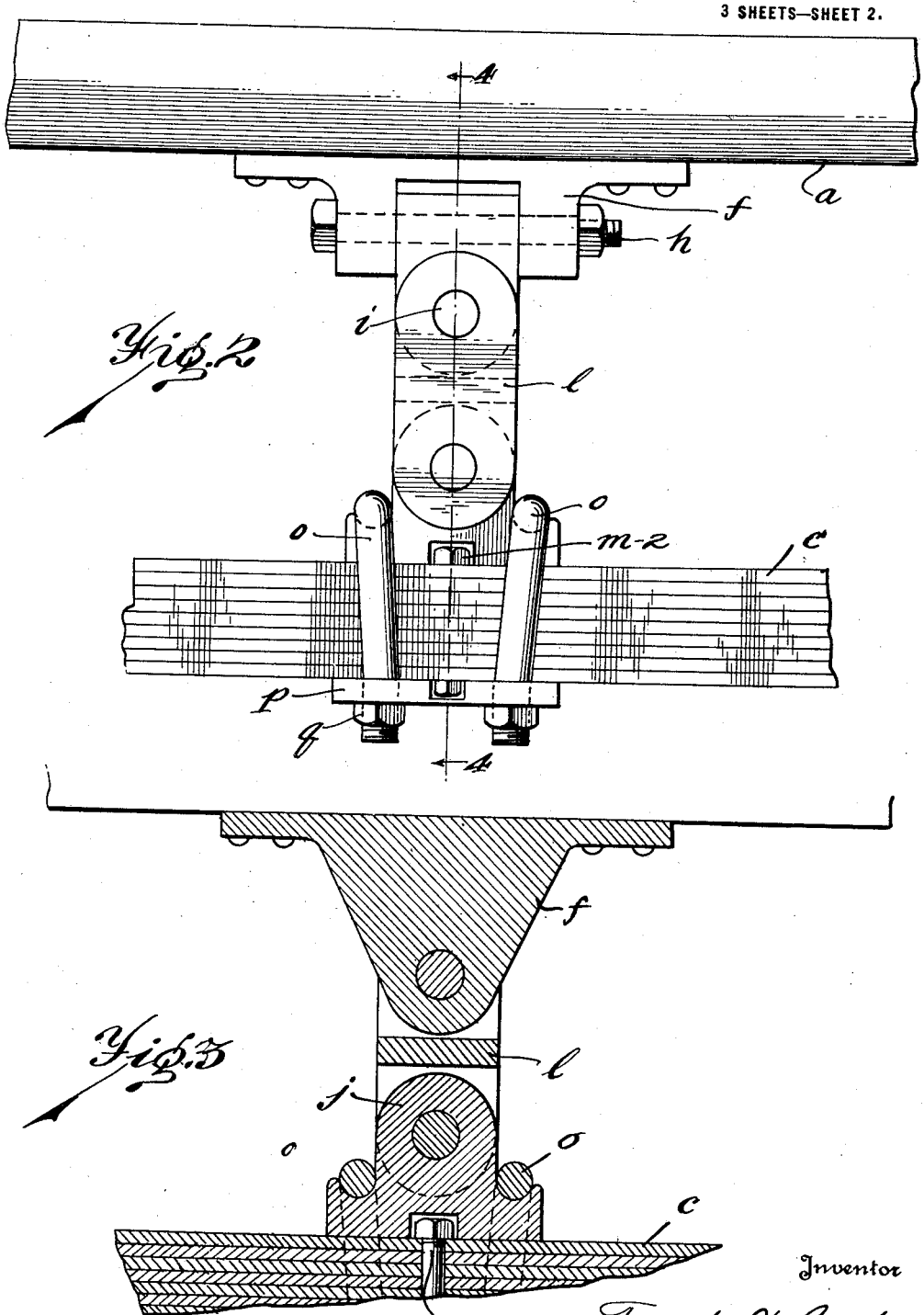

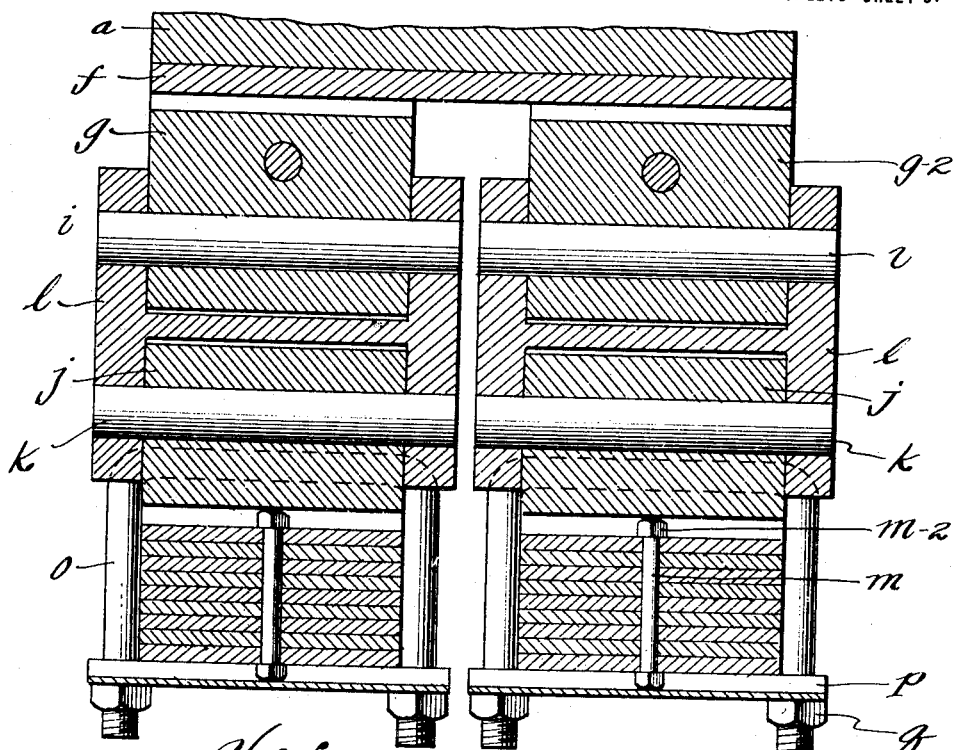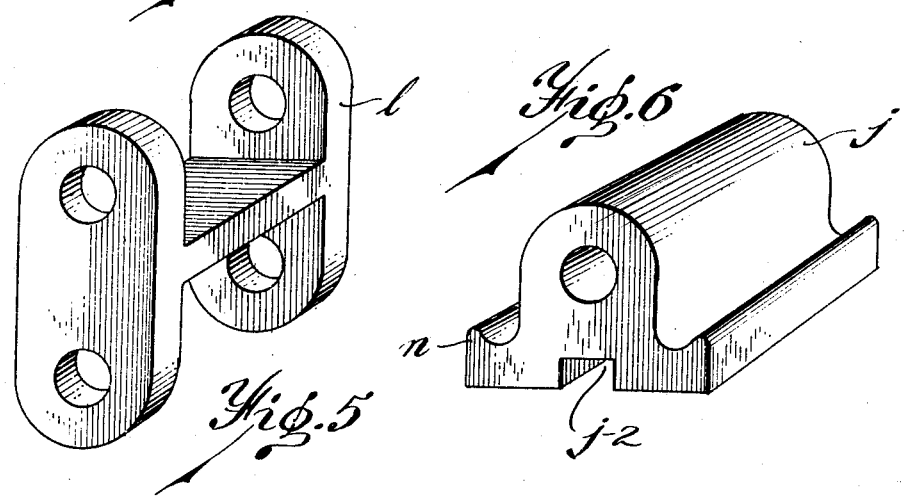

FRANK V. COOKE, OF HIGHLAND PARK, MICHIGAN.

VEHICLE-SPRING.

1,369,009.

Specification of Letters Patent.    Patented Feb. 22, 1921.

Application filed March 1, 1920. Serial No. 362,295.

*To all whom it may concern:*

Be it known that I, FRANK V. COOKE, a citizen of the United States, residing at Highland Park, county of Wayne, State of Michigan, have invented a certain new and useful Improvement in Vehicle-Springs, and declare the following to be a full, clear, and exact description of the same, such as will enable others skilled in the art to which it pertains to make and use the same, reference being had to the accompanying drawings, which form a part of this specification.

My invention relates to improvements in vehicle springs and particularly to springs designed for use with automotive vehicles. It is here shown in the form of a spring attached to the rear axle of such a vehicle.

The object is to provide means for use in connection with springs of the type shown in the accompanying drawings, whereby the weight of the body of the vehicle may be carried by said springs in the most advantageous manner.

In the drawings,—

Figure 1 is a perspective of my improved spring attached to a rear axle.

Fig. 2 is a fragmentary elevational view.

Fig. 3 is a modified form of my device.

Fig. 4 is a vertical cross-section taken on the line IV—IV of Fig. 2.

Fig. 5 is a perspective of the H-shaped link between the body and the spring.

Fig. 6 is a perspective of the bearing block carried by the spring.

Fig. 7 is a perspective of one of the bearing blocks carried by the vehicle frame.

Let $a$ represent the cross-piece of a vehicle frame; $b$ the rear axle and $c$ and $d$, cross-springs intervening the axle and frame. The spring $c$ pivoted at one end to the fixed bracket $c^2$ carried by the frame, is pivoted at the other end to the farther extremity of the axle by means of shackle $e$. The spring $d$ is pivoted to fixed bracket $d^2$ carried at the other side of the frame and to the opposite extremity of the axle by means of a shackle $e$. Intermediate of frame member $a$ is a depending bracket $f$ recessed to receive a pair of bearing blocks $g$ and $g^2$ which are adapted to be positioned therein and held in place by means of bolt $h$. These bearing blocks are separately positioned and as each one is pivotally mounted upon individual bolts $h$, a limited tilting movement is permitted each block. It will be observed that they are so mounted, spaced from the frame, as to permit of this limited tilting movement, and positioned in bracket $f$ spaced one from the other and perforated to receive a pin $i$ upon which pin is loosely sleeved a pair of H-shaped links or shackles $l$. These links $l$ are individually mounted so as to permit of individual pivotal movement and are adapted to swing about their point of support upon the pin $i$. Each of these shackles $l$ is adapted to carry a bearing block $j$ pivoted in position therein by means of a pin $k$ carried by said shackle. These bearing blocks $j$ are adapted to be fastened to the spring so as to provide a pivotal supporting fulcrum for each spring.

Separate leaves of the springs are held together by means of a tie-bolt $m$. A pair of clevises $o$ are provided with screwthreaded ends adapted to receive a tie-plate $p$ which is held in place thereon by means of nuts $q$, said clevises being adapted to encircle individual springs. A single pair of clevises is adapted to hold a bearing block $j$ in position on the spring, as shown in Fig. 2. Each bearing block $j$ is provided with upwardly-turned side flanges $n$ over which the clevis engages and a slot $j^2$ is adapted to receive the projected end $m^2$ of the tie-bolt $m$. In a similar manner the tie-plate $p$ is recessed to receive the opposite projecting end of the tie bolt. It will be apparent that when the clevis is fastened securely in place the bearing block $j$ will be securely attached to the spring member and that each separate bearing block $j$, as it coöperates with its shackle $l$ and the fixed bearing block $g$ carried by the frame or body will form a pivotally-supporting fulcrum for each spring which will resist upward, vertical movement of the spring but will permit angular movement varying from the longitudinal to the vertical along the line of the arc described by this pivotal fulcrum support.

Fig. 3 represents a modification in which the bearing blocks $g$ are cast integral with the bracket $f$ affixed to the body. Otherwise the construction is similar to that above described.

The action of the apparatus is apparent from the above description.

I claim:

1. The combination with a vehicle body, an axle, a spring pivoted to one side of the body and to the end of the axle farthest therefrom, a spring pivoted to the other side of the body and to the opposite end of the axle, and depending fulcrum members pivoted at one end to the body and at their opposite ends to the springs so as to provide individual rigidly vertical fulcrum support for each of said springs, but to permit movement along the arc of a circle described by such pivoted fulcrum members.

2. The combination with a vehicle body, an axle, a spring pivoted to one side of the body and to the end of the axle farthest therefrom, a spring pivoted to the other side of the body and to the opposite end of the axle, and a fulcrum member pivoted to each spring, the ends of said fulcrum member opposite the ends pivoted to the springs pivoted to the body so as to provide a pivotally supported fulcrum carried by the body of the vehicle for each of said springs.

3. In combination with a vehicle body, an axle, a spring pivoted to one side of the body and to the end of the axle farthest therefrom, a spring pivoted to the other side of the body and to the opposite end of the axle, a clamp encircling each of said springs intermediate their ends, and a link swiveled to said clamp and having its opposite end pivoted to the body so as to form a pivotally-supported fulcrum for each of said springs.

4. In combination with a vehicle frame, an axle, a spring pivoted to one side of the frame and to the end farthest therefrom, a spring pivoted to the other side of the frame and to the opposite end of the axle, a clamp encircling each of said springs, a pair of bearing blocks fixed to the frame, and a link pivoted at one end to each of said bearing blocks and at the opposite end to the clamp carried by the spring so as to provide a swinging fulcrum support for each of said springs.

5. In combination with a vehicle frame, an axle pivoted to one side of the body and to the end of the axle farthest therefrom, a spring pivoted to the other side of the body and to the opposite end of the axle, a pair of bearing blocks pivoted to the body in such a manner as to permit of limited vertical tilting movement at right angles to the springs, and a depending fulcrum member pivoted to each of said bearing blocks whose pivotal axis is at right angles to the pivotal axis of the bearing members, each of said fulcrum members pivoted to a spring.

In testimony whereof, I sign this specification.

FRANK V. COOKE.